United States Patent
Bansal et al.

(10) Patent No.: US 11,579,577 B2
(45) Date of Patent: Feb. 14, 2023

(54) METHODS AND APPARATUS FOR GRID CONNECTIVITY CONTROL

(71) Applicant: Enphase Energy, Inc., Petaluma, CA (US)

(72) Inventors: Ashish Bansal, Karnataka (IN); Sumit Saraogi, Fremont, CA (US); Rohit Harlalka, Karnataka (IN); Karthik Lakshminarayanan, Karnataka (IN); Manikandan Thirugnanasambandam Saingaravelu, Tamilnadu (IN)

(73) Assignee: Enphase Energy, Inc., Petaluma, CA (US)

( * ) Notice: Subject to any disclaimer, the term of this patent is extended or adjusted under 35 U.S.C. 154(b) by 89 days.

(21) Appl. No.: 17/104,763

(22) Filed: Nov. 25, 2020

(65) Prior Publication Data

US 2021/0157290 A1    May 27, 2021

Related U.S. Application Data

(60) Provisional application No. 62/940,249, filed on Nov. 25, 2019.

(51) Int. Cl.
| | |
|---|---|
| *G05B 19/042* | (2006.01) |
| *G06F 3/04842* | (2022.01) |
| *G06F 21/31* | (2013.01) |
| *H04L 67/12* | (2022.01) |

(52) U.S. Cl.
CPC ....... *G05B 19/042* (2013.01); *G06F 3/04842* (2013.01); *G06F 21/31* (2013.01); *G05B 2219/2639* (2013.01); *H04L 67/12* (2013.01)

(58) Field of Classification Search
CPC .................................................. G05B 19/042
See application file for complete search history.

(56) References Cited

U.S. PATENT DOCUMENTS

| | | | |
|---|---|---|---|
| 8,099,197 B2 | 1/2012 | Smith et al. | |
| 8,693,580 B2 | 4/2014 | McHann, Jr. | |
| 9,897,665 B2 | 2/2018 | Taft | |
| 2012/0161523 A1* | 6/2012 | Kim | H02J 13/0075 307/66 |

(Continued)

FOREIGN PATENT DOCUMENTS

| | | |
|---|---|---|
| AU | 2009333362 B2 | 8/2010 |
| JP | 2019097333 A | 6/2019 |

(Continued)

OTHER PUBLICATIONS

International Search Report and written opinion for application No. PCT/US2020/062224, dated Mar. 26, 2021.

*Primary Examiner* — Roland J Casillas
(74) *Attorney, Agent, or Firm* — Moser Taboada

(57) ABSTRACT

Methods and apparatus for grid connectivity control are provided herein. For example, a method can include receiving status information of a microgrid configured to connect to a grid, transmitting a live status update screen of the microgrid to a user, the live status update screen comprising a grid connectivity button configured to receive a user input and based on a received user input, transmitting a control signal to a microgrid interconnect device connected between the microgrid and the grid for coordinating one of connection or disconnection microgrid connected to the grid.

18 Claims, 9 Drawing Sheets

(56) References Cited

U.S. PATENT DOCUMENTS

| | | |
|---|---|---|
| 2012/0284790 A1 | 11/2012 | Bhargava |
| 2016/0190864 A1 | 6/2016 | Yeon et al. |
| 2019/0081479 A1* | 3/2019 | Faley .................... H02J 3/382 |
| 2019/0354127 A1 | 11/2019 | Forbes, Jr. |

FOREIGN PATENT DOCUMENTS

| | | |
|---|---|---|
| KR | 101845703 B1 | 4/2018 |
| WO | WO-2017120331 A1 | 7/2017 |

* cited by examiner

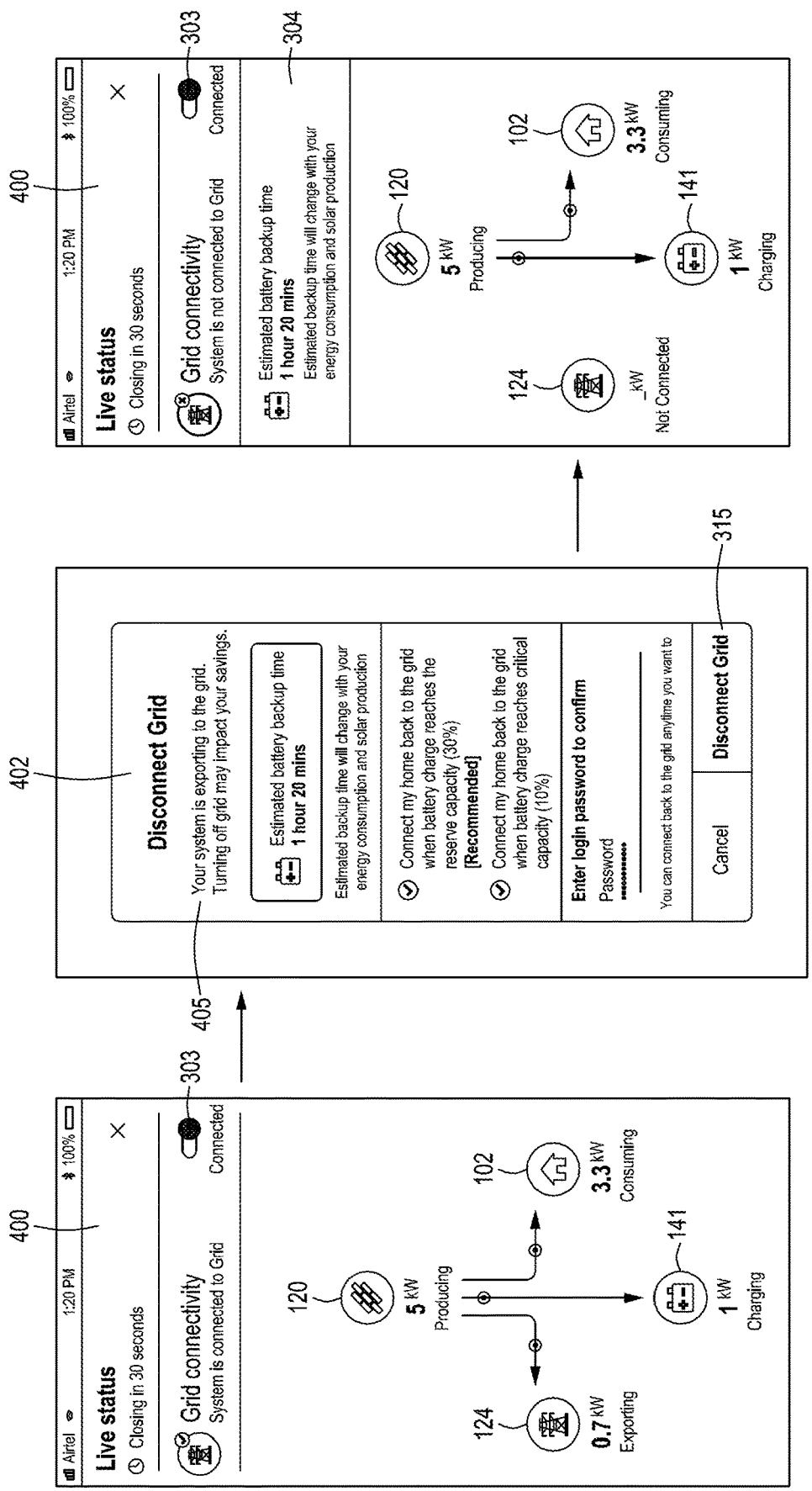

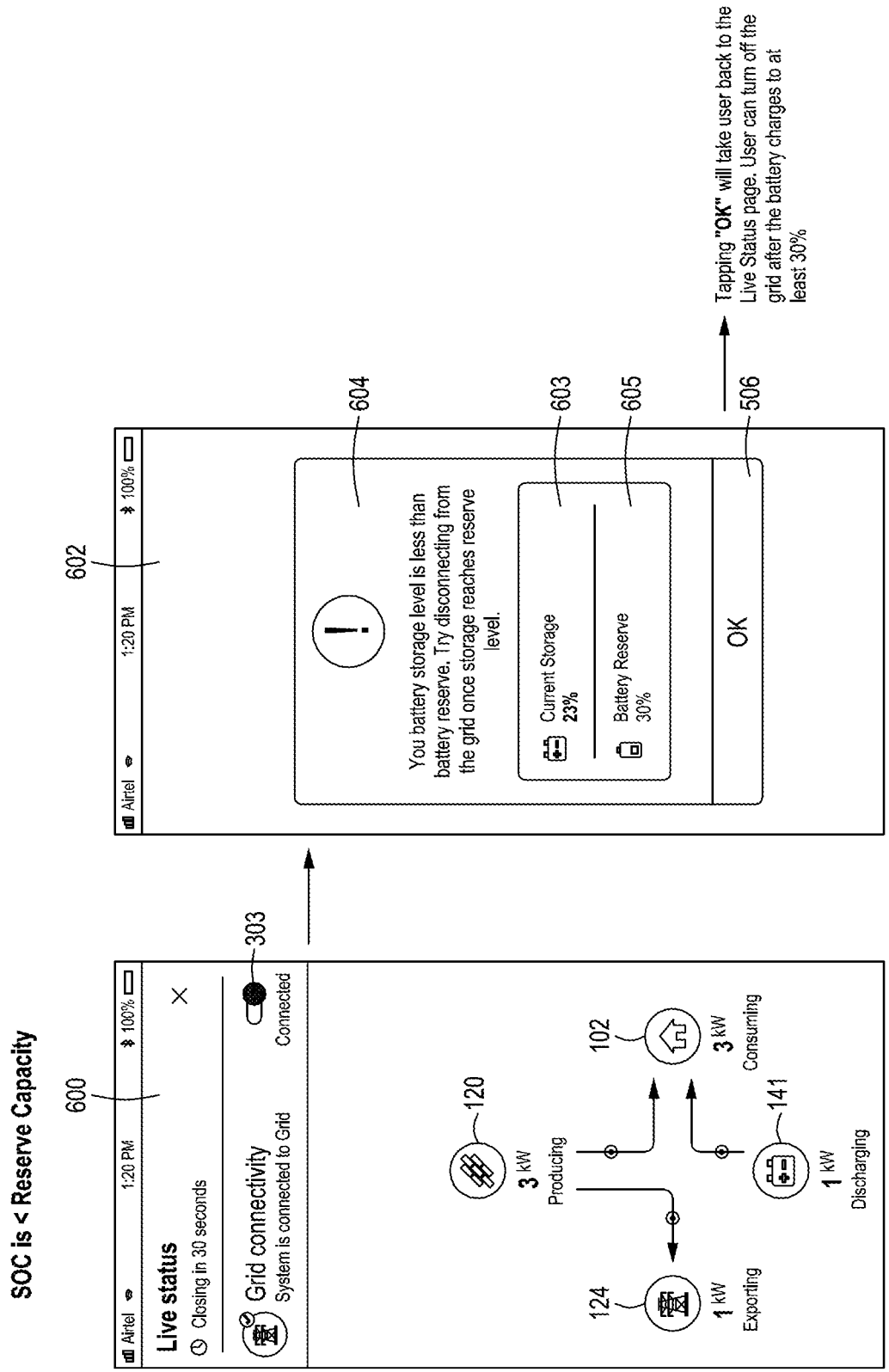

METHODS AND APPARATUS FOR GRID CONNECTIVITY CONTROL

CROSS-REFERENCE TO RELATED APPLICATIONS

The present application claims the benefit of and priority to U.S. Provisional Patent Application Ser. No. 62/940,249, which was filed on Nov. 25, 2019, the entire contents of which is incorporated herein by reference.

BACKGROUND

Field of the Disclosure

Embodiments of the present disclosure relate generally to grid-connected connectivity of a renewable energy system.

Description of the Related Art

The current worldwide growth of energy demand coupled with the desire to move away from fossil fuels is leading to increased interest in and deployment of renewable energy systems, such as photovoltaic (PV) power systems. Grid-connected microgrids comprising PV systems are designed to be connected to and synchronous with another power grid, such as a commercial grid, but can also function autonomously in an island mode when disconnected from the grid. Grid-connected microgrids typically include one or more energy storage and delivery devices, such as a battery, in order ensure power is available for critical loads when the microgrid is islanded. Under certain physical and/or economic conditions, it may be desirable to intentionally disconnect a microgrid from the grid or connect the microgrid back to the grid.

Therefore, there is a need in the art for a simple means for a user to control microgrid connectivity to the grid.

SUMMARY

Embodiments of the present disclosure generally relate to methods and apparatus for grid connectivity control substantially as shown in and/or described in connection with at least one of the figures, as set forth more completely in the claims.

For example, in accordance with at least some embodiments of the present disclosure, the method includes receiving status information of a microgrid configured to connect to a grid, transmitting a live status update screen of the microgrid to a user, the live status update screen comprising a grid connectivity button configured to receive a user input, and based on a received user input, transmitting a control signal to a microgrid interconnect device connected between the microgrid and the grid for coordinating one of connection or disconnection microgrid connected to the grid.

In accordance with at least some embodiments of the present disclosure, a non-transitory computer readable storage medium having stored thereon instructions that when executed by a processor perform a method for grid connectivity control. The method includes receiving status information of a microgrid configured to connect to a grid, transmitting a live status update screen of the microgrid to a user, the live status update screen comprising a grid connectivity button configured to receive a user input, and based on a received user input, transmitting a control signal to a microgrid interconnect device connected between the microgrid and the grid for coordinating one of connection or disconnection microgrid connected to the grid.

In accordance with at least some embodiments of the present disclosure, an apparatus for grid connectivity control includes a microgrid configured to connect to a grid and a controller configured to receive status information of the microgrid, transmit a live status update screen of the microgrid to a user, the live status update screen comprising a grid connectivity button configured to receive a user input, and based on a received user input, transmit a control signal to a microgrid interconnect device connected between the microgrid and the grid for coordinating one of connection or disconnection microgrid connected to the grid.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 4A-4C are diagrams of screens in accordance with one or more embodiments of the present disclosure.

FIGS. 6A and 6B are diagrams of screens in accordance with one or more embodiments of the present disclosure.

DETAILED DESCRIPTION

Embodiments of the present disclosure generally relate to a method and apparatus for enabling a user to easily and intuitively control microgrid connectivity with a grid defined by user configuration and system state.

Figure 1:
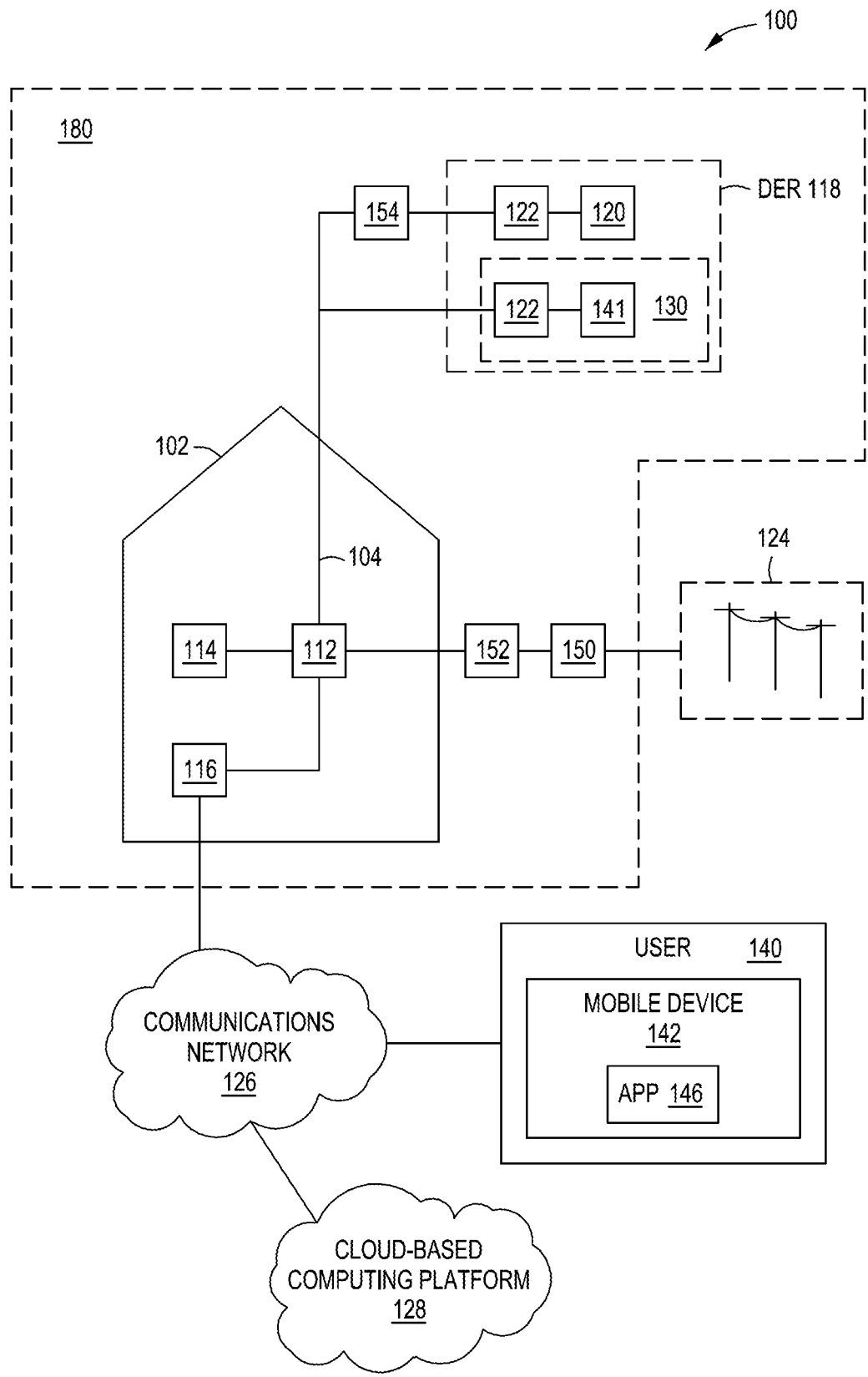
FIG. 1 is a block diagram of a power conversion system in accordance with one or more embodiments of the present disclosure.

FIG. 1 is a block diagram of a system 100 (e.g., power conversion system) in accordance with one or more embodiments of the present disclosure. The diagram of FIG. 1 only portrays one variation of the myriad of possible system configurations. The present disclosure can function in a variety of environments and systems.

The system 100 comprises a structure 102 (e.g., a user's structure), such as a residential home or commercial building, having an associated distributed energy resource 118 (DER 118). The DER 118 is situated external to the structure 102. For example, the DER 118 may be located on the roof of the structure 102. The structure 102 comprises one or more loads and/or energy storage devices 114 (e.g., appliances, electric hot water heaters, thermostats/detectors, boilers, and the like) and a DER controller 116, each coupled to a load center 112. Although the energy storage devices 114, the DER controller 116, and the load center 112 are depicted as being located within the structure 102, one or more of these may be located external to the structure 102.

The load center 112 is coupled to the DER 118 by an AC bus 104 and is further coupled, via a meter 152 and a microgrid interconnect device (MID) 150, to a grid 124 (e.g., a commercial power grid). The structure 102, the energy storage devices 114, DER controller 116, DER 118, load center 112, generation meter 154, meter 152, and MID 150 are part of a microgrid 180. It should be noted that one or more additional devices not shown in FIG. 1 may be part of the microgrid 180. For example, a power meter or similar device may be coupled to the load center 112.

The DER 118 comprises at least one renewable energy source (RES) coupled to the power conditioners 122. For example, the DER 118 may comprise a plurality of RESs 120 coupled to a plurality of power conditioners 122 in a one-to-one correspondence. In embodiments described herein, each RES of the plurality of RESs 120 is a photovoltaic module (PV module), although in other embodiments the plurality of RESs 120 may be any type of system for generating DC power from a renewable form of energy, such as wind, hydro, and the like. The DER 118 may further comprise one or more batteries (or other types of energy storage/delivery devices) coupled to the power conditioners 122 in a one-to-one correspondence, where each pair of power conditioner 122 and a corresponding battery 141 may be referred to as an AC battery 130.

The power conditioners 122 convert the generated DC power from the plurality of RESs 120 and/or the battery 141 to AC power that is grid-compliant and couple the generated AC power to the grid 124 via the load center 112. The generated AC power may be additionally or alternatively coupled via the load center 112 to the one or more loads and/or energy storage devices 114. In addition, the power conditioners 122 that are coupled to the batteries 141 convert AC power from the AC bus 104 to DC power for charging the batteries 141. A generation meter 154 is coupled at the output of the power conditioners 122 that are coupled to the plurality of RESs 120 in order to measure generated power.

In some alternative embodiments, the power conditioners 122 may be AC-AC converters receive AC input and convert one type of AC power to another type of AC power. In other alternative embodiments, the power conditioners 122 may be DC-DC converters that convert one type of DC power to another type of DC power. In some of such embodiments, the DC-DC converters may be coupled to a main DC-AC inverter for converting the generated DC output to an AC output.

The power conditioners 122 may communicate with one another and with the DER controller 116 using power line communication (PLC), although additionally and/or alternatively other types of wired and/or wireless communication may be used. The DER controller 116 may provide operative control of the DER 118 and/or receive data or information from the DER 118. For example, the DER controller 116 may be a gateway that receives data (e.g., alarms, messages, operating data, performance data, and the like) from the power conditioners 122 and communicates the data and/or other information via the communications network 126 to a cloud-based computing platform 128, which can be configured to execute one or more application software, e.g., a grid connectivity control application, to a remote device or system such as a master controller (not shown), and the like. The DER controller 116 may also send control signals to the power conditioners 122, such as control signals generated by the DER controller 116 or received from a remote device or the cloud-based computing platform 128. The DER controller 116 may be communicably coupled to the communications network 126 via wired and/or wireless techniques. For example, the DER controller 116 may be wirelessly coupled to the communications network 126 via a commercially available router. In one or more embodiments, the DER controller 116 comprises an application-specific integrated circuit (ASIC) or microprocessor along with suitable software (e.g., a grid connectivity control application) for performing one or more of the functions described herein. For example, the DER controller 116 can include a memory (e.g., a non-transitory computer readable storage medium) having stored thereon instructions that when executed by a processor perform a method for grid connectivity control, as described in greater detail below.

The generation meter 154 (which may also be referred to as a production meter) may be any suitable energy meter that measures the energy generated by the DER 118 (e.g., by the power conditioners 122 coupled to the plurality of RESs 120). The generation meter 154 measures real power flow (kWh) and, in some embodiments, reactive power flow (kVAR). The generation meter 154 may communicate the measured values to the DER controller 116, for example using PLC, other types of wired communications, or wireless communication. Additionally, battery charge/discharge values are received through other networking protocols from the AC battery 130 itself.

The meter 152 may be any suitable energy meter that measures the energy consumed by the microgrid 180, such as a net-metering meter, a bi-directional meter that measures energy imported from the grid 124 and well as energy exported to the grid 124, a dual meter comprising two separate meters for measuring energy ingress and egress, and the like. In some embodiments, the meter 152 comprises the MID 150 or a portion thereof. The meter 152 measures one or more of real power flow (kWh), reactive power flow (kVAR), grid frequency, and grid voltage.

The MID 150, which may also be referred to as an island interconnect device (IID), connects/disconnects the microgrid 180 to/from the grid 124. The MID 150 comprises a disconnect component (e.g., a contactor or the like) for physically connecting/disconnecting the microgrid 180 to/from the grid 124. For example, the DER controller 116 receives information regarding the present state of the system from the power conditioners 122, and also receives the energy consumption values of the microgrid 180 from the meter 152 (for example via one or more of PLC, other types of wired communication, and wireless communication), and based on the received information (inputs), the DER controller 116 determines when to go on-grid or off-grid and instructs the MID 150 accordingly. In some alternative embodiments, the MID 150 comprises an ASIC or CPU, along with suitable software (e.g., an islanding module) for determining when to disconnect from/connect to the grid 124. For example, the MID 150 may monitor the grid 124 and detect a grid fluctuation, disturbance or outage and, as a result, disconnect the microgrid 180 from the grid 124. Once disconnected from the grid 124, the microgrid 180 can continue to generate power as an intentional island without imposing safety risks, for example on any line workers that may be working on the grid 124.

In some alternative embodiments, the MID 150 or a portion of the MID 150 is part of the DER controller 116. For example, the DER controller 116 may comprise a CPU and an islanding module for monitoring the grid 124, detecting grid failures and disturbances, determining when to disconnect from/connect to the grid 124, and driving a disconnect component accordingly, where the disconnect component may be part of the DER controller 116 or, alternatively, separate from the DER controller 116. In some embodiments, the MID 150 may communicate with the DER controller 116 (e.g., using wired techniques such as power line communications, or using wireless communication) for coordinating connection/disconnection to the grid 124.

A user 140 can use one or more computing devices, such as a mobile device 142 (e.g., a smart phone, tablet, or the like) communicably coupled by wireless means to the communications network 126. The mobile device 142 has a CPU, support circuits, and memory, and has one or more applications (e.g., a grid connectivity control application (application 146)) installed thereon for controlling the connectivity with the grid 124 as described herein. The application 146 may run on commercially available operating systems, such as IOS, ANDROID, and the like.

In order to control connectivity with the grid 124, the user 140 interacts with an icon displayed on the mobile device 142, for example a grid on-off toggle control or slide, which is referred to herein as a toggle button. The toggle button may be presented on one or more status screens pertaining to the microgrid 180, such as a live status screen 300 (see FIG. 3A, for example), for various validations, checks and alerts. The first time the user 140 interacts with the toggle button, the user 140 is taken to a consent page, such as a grid connectivity consent page, under setting and will be allowed to interact with toggle button only after he/she gives consent.

Once consent is received, the scenarios below, listed in order of priority, will be handled differently. Based on the desired action as entered by the user 140, the corresponding instructions are communicated to the DER controller 116 via the communications network 126 using any suitable protocol, such as HTTP(S), MQTT(S), WebSockets, and the like. The DER controller 116, which may store the received instructions as needed, instructs the MID 150 to connect to or disconnect from the grid 124 as appropriate.

Figure 2:
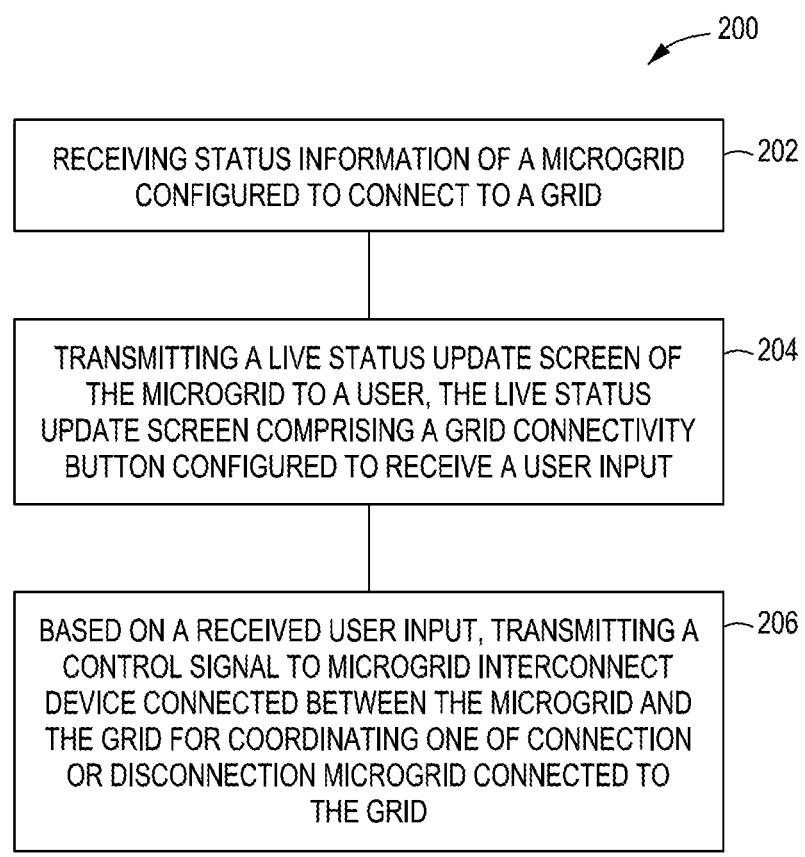
FIG. 2 is flowchart of a method for grid connectivity control in accordance with one or more embodiments of the present disclosure.

FIG. 2 is a method 200 for application grid connectivity control in accordance with one or more embodiments of the present disclosure. For example, in at least some embodiments, at 202, the method 200 includes receiving status information of a microgrid configured to connect to a grid. For example, the DER controller 116 can receive status information from the power conditioners 122, the batteries 142, other components of the microgrid, and/or energy consumption values of the microgrid 180.

Figures 3A, 3B, 3C:
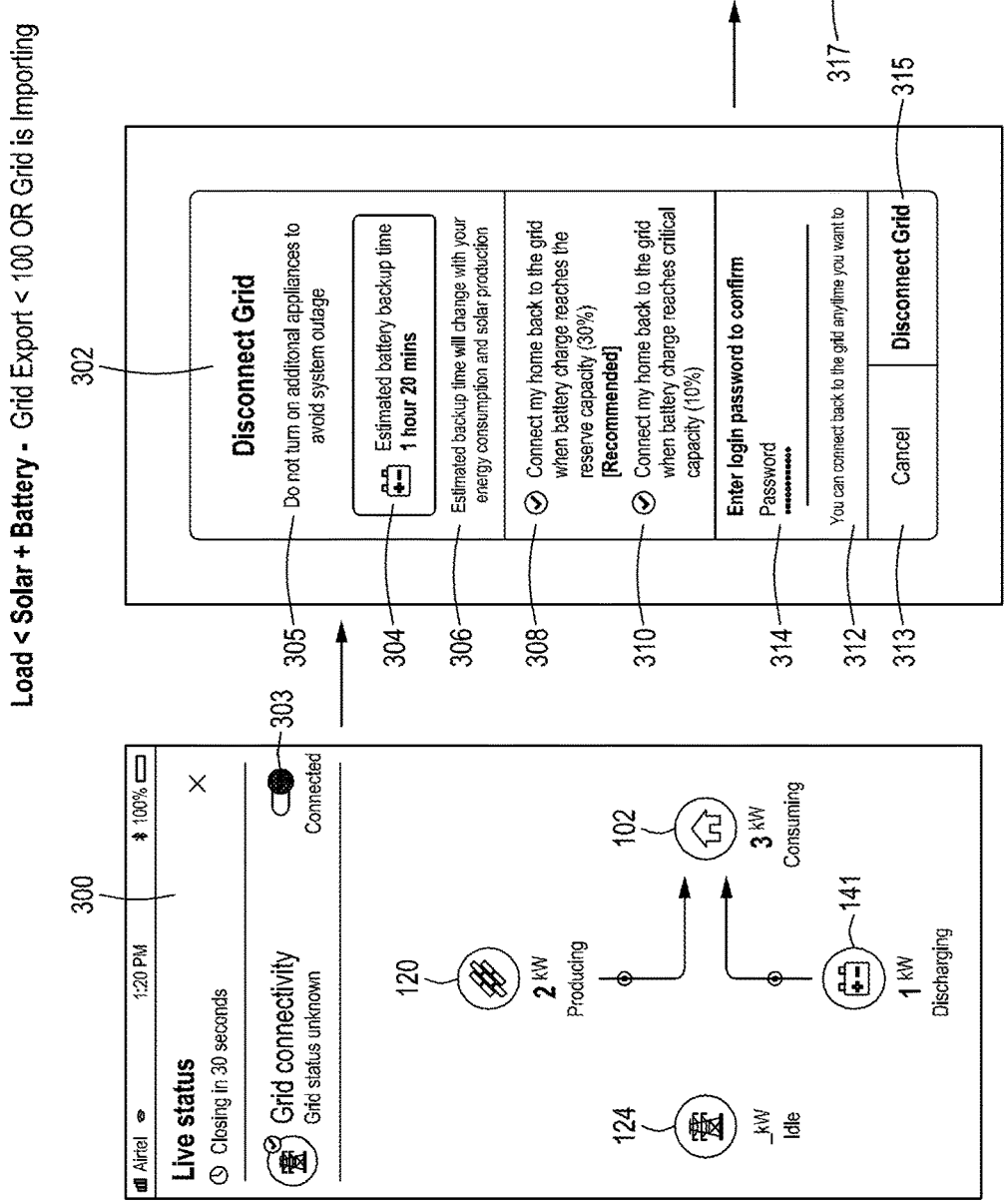
FIGS. 3A-3E are diagrams of screens in accordance with one or more embodiments of the present disclosure.
Figure 3D:
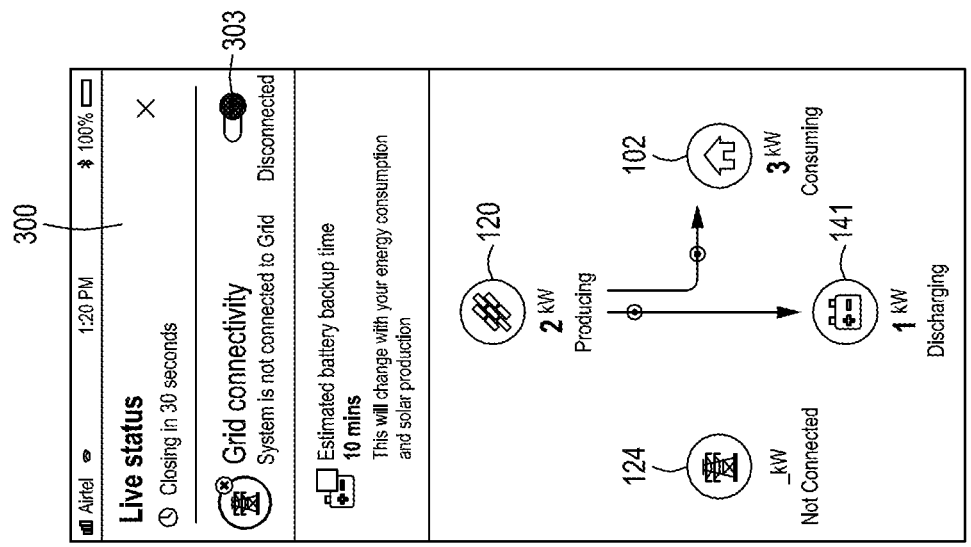
Figure 3E:
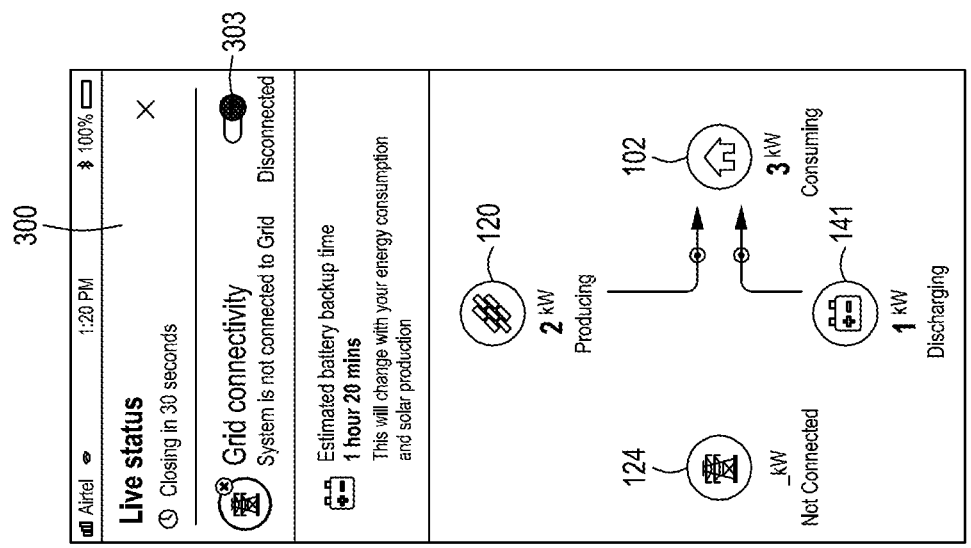

Next, 204, the method 200 includes transmitting a live status update screen (e.g., the live status screen 300 of FIG. 3) of the microgrid to a user, wherein the live status update screen 300 comprises a grid connectivity button 303 configured to receive a user input, as will be described in greater detail below. For example, in at least some embodiments, such as when a load is less than solar and battery, a grid is exporting less X watts or grid is importing, and state of charge (SOC) is greater than a reserve capacity (e.g., load<solar+battery, grid export<X Watts or grid is importing, and state of charge (SOC)>reserve capacity) a user 140 can get a suggestion/alert (e.g., a text, email, voice message, and the like) that turning on additional appliances will risk system outage. For example, at 204 the live status screen 300 displays the grid 124 as currently being connected (e.g., at a toggle button 303) and a flow (or connection) diagram illustrating a relationship between the grid 124, the battery 141, the plurality of RESs 120 (e.g., PV modules), and the structure 102 (e.g., a user's home). In FIG. 3A the flow diagram of the live status screen 300 shows an icon the plurality of RESs 120 (e.g., producing) and an icon representing the batteries 141 (e.g., discharging) each producing and providing power to an a icon representing the structure 102, while an icon can represent the grid 124, which is shown connected but in idle (e.g., neither importing or exporting).

The method 200 can include transmitting a suggestion from a controller to a user. For example, in at least some embodiments, such as when the grid 124 is exporting a particular amount of power, e.g., about 100 W, and turning on additional loads, e.g., appliances, would risk system outage, the DER controller 116 is configured to transmit a disconnect grid screen 302 via the communications network 126 to the user 140, e.g., via the mobile device 142. The disconnect grid screen 302 can display an information area 305 (e.g., a first information area, e.g., letting the user know not to turn on additional appliances to avoid system outage) and an estimated battery backup time area 304, e.g., 1 hour 20 minutes, which provides an estimation of battery backup time. The disconnect grid screen 302 can comprise an information area that provides information relating to the battery back up time. For example, the disconnect grid screen 302 can display an information area 306, e.g., a second information area, e.g., letting the user know that the estimated battery backup time will change with energy consumption and solar production.

In at least some embodiments, the DER controller 116 is configured to determine/measure a reserve capacity or critical capacity of the batteries 141 charge that is suitable for a user reconnecting to the grid 124. For example, in at least some embodiments, the disconnect grid screen 302 can include one or more options for reconnecting to the grid 124, e.g., based on a battery charge capacity. For example, the user 140 can select an option for reconnecting to the grid 124. For example, in at least some embodiments, the disconnect grid screen 302 can include an option at a first selectable area 308 for reconnecting the user's 140 home (e.g., the structure 102) back to the grid 124 when the batteries 141 charge reaches a determined reserve capacity (e.g., reconnect my home when charge reaches a reserve capacity, e.g., about 30%, which can be displayed as a recommended option). Likewise, in at least some embodiments, the disconnect grid screen 302 can include an option at a second selectable area 310 for reconnecting the user's 140 home back to the grid 124 when the battery 141 charge reaches a determined critical capacity (e.g., reconnect my home when charge reaches a critical capacity, e.g., about 10%). If the user 140 selects either of the options, the DER controller 116 is configured to automatically reconnect the home to the grid 124 based a selection of the user 140. Alternatively, or additionally, the DER controller 116 is configured to transmit other options/information to the user 140. For example, in at least some embodiments, the DER controller 116 is configured to transmit an information area 312 (e.g., a third information area), which can be selectable, to a user that allows the user to connect to the grid 124 at any time (e.g., letting a user know that they can connect back to the grid at any time).

Next, at 206, the method 200 comprises based on a received user input, transmitting a control signal to a microgrid interconnect device connected between the microgrid and the grid for coordinating one of connection or disconnection microgrid connected to the grid. For example, the DER controller 116 is configured to transmit the disconnect grid screen 302 including two call-to-action buttons 313 (e.g., a first call-to-action button), 315 (e.g., a second call-to-action button) (FIG. 3B), e.g., for cancelling and for disconnecting the user's home from the grid 124, e.g., "cancel" and "disconnect grid," respectively. Thus, the user 140 can enter an input for selecting whether the user 140 wishes to keep the user's home connected to the grid 140 (e.g., "cancel or stay connected to grid") or if the user 140 wishes to disconnect the user's home from the grid 124 (e.g., "disconnect grid"). In either instance, the disconnect grid screen 302 includes an input area 314 for receiving the user's password (e.g., "enter login password to confirm") after selecting whether to stay connected to grid 124 or disconnect from the grid 124 before proceeding in accordance with the user's 140 selection at 206. For example, the user 140 can enter the password using the virtual keyboard 317 on the mobile device 142 (FIG. 3C).

Next, the DER controller 116 is configured to transmit a control signal to the MID 150. For example, the DER controller 116 may store the received instructions (e.g., user selection from 206) as needed, and instructs the MID 150 to remain connected to, connect to, or disconnect from the grid 124 as appropriate.

Next, the DER controller 116 is configured to again transmit the live status screen 300 with the updated status of the grid connectivity (e.g., one of a connected or disconnected configuration). For example, in the instance when the user 140 selects disconnect at 206, the live status screen 300 (e.g., an another live status screen comprising the flowchart showing an updated relationship between the grid, the photovoltaic module, the structure, and the battery) displays the grid connectivity as disconnected at the toggle button 303, with the estimated battery backup time area 304 of FIG. 3D, which can be shown in green when there is adequate estimated battery backup time (e.g., 1 hour 20 minutes), or with the estimated battery backup time area 304 of FIG. 3E, which can be shown in red when there is inadequate estimated battery backup time (e.g., 10 minutes).

As noted above, a user can connect to or disconnect from the grid at any time, e.g. anytime a live status screen is displayed. For example, in at least some embodiments, the application 146 can be configured to instruct the DER controller 116 to send future live status screens at predetermined times, at predetermined battery levels, etc., and a user can simply press the toggle button 303 on the received future live status screens to connect to or disconnect from the grid.

In at least some embodiments, the method 200 can be configured such that when a load is less than solar and battery, exporting to grid is greater than a predetermined power, e.g., 100 W, and state of charge (SOC) is greater than a reserve capacity (e.g., load<solar+battery, export to grid, and state of charge SOC>reserve capacity) a user 140 can get a suggestion/alert (e.g., a text, email, voice message, and the like) that the system is exporting to the grid, and turning off grid may impact a user's saving. In such an embodiment, the DER controller 116 is configured to transmit a live status screen 400 (FIG. 4A). For example, the live status screen 400 displays the grid 124 as currently being connected (e.g., at a toggle button 303) and a flow diagram illustrating a relationship between the grid 124, the batteries 141, the plurality of RESs 120 (e.g., PV module), and the structure 102. In FIG. 4A the live status screen 400 shows the RES 120 producing and providing power to each of the structure 102 and the battery 141 (e.g., charging), and the grid 124 (e.g., exporting).

Additionally, unlike the disconnect grid screen 302, the DER controller 116 is configured to transmit a disconnect grid screen 402 via the communications network 126 to the user, e.g., via the mobile device 142. The disconnect grid screen 402 can display an information area 405 (e.g., a second information area, e.g., letting the user know that the system is exporting to the grid and turning off grid may impact user savings). The other contents of the disconnect grid screen 402 of FIG. 4B can be identical to the disconnect grid screen 302 of FIG. 3B. Similarly, the DER controller 116 is configured to again transmit the live status screen 400 with the updated status of the grid connectivity. For example, in the instance when the user 140 selects disconnect at 206, the live status screen 400 displays the grid connectivity as disconnected at the toggle button 303, with the estimated battery backup time area 304 of FIG. 4C, which can be shown in green when there is adequate estimated battery backup time (e.g., 1 hour 20 minutes), or with the estimated battery backup time area 304 of FIG. 3E, which can be shown in red when there is not adequate estimated battery backup time (e.g., 10 minutes). Additionally, the flow diagram of the live status screen 400 of FIG. 4C shows the plurality of RESs 120 producing and providing power to each of the structure 102 and the batteries 141 (e.g., charging), and the grid 124 not connected.

Figures 5A, 5B:
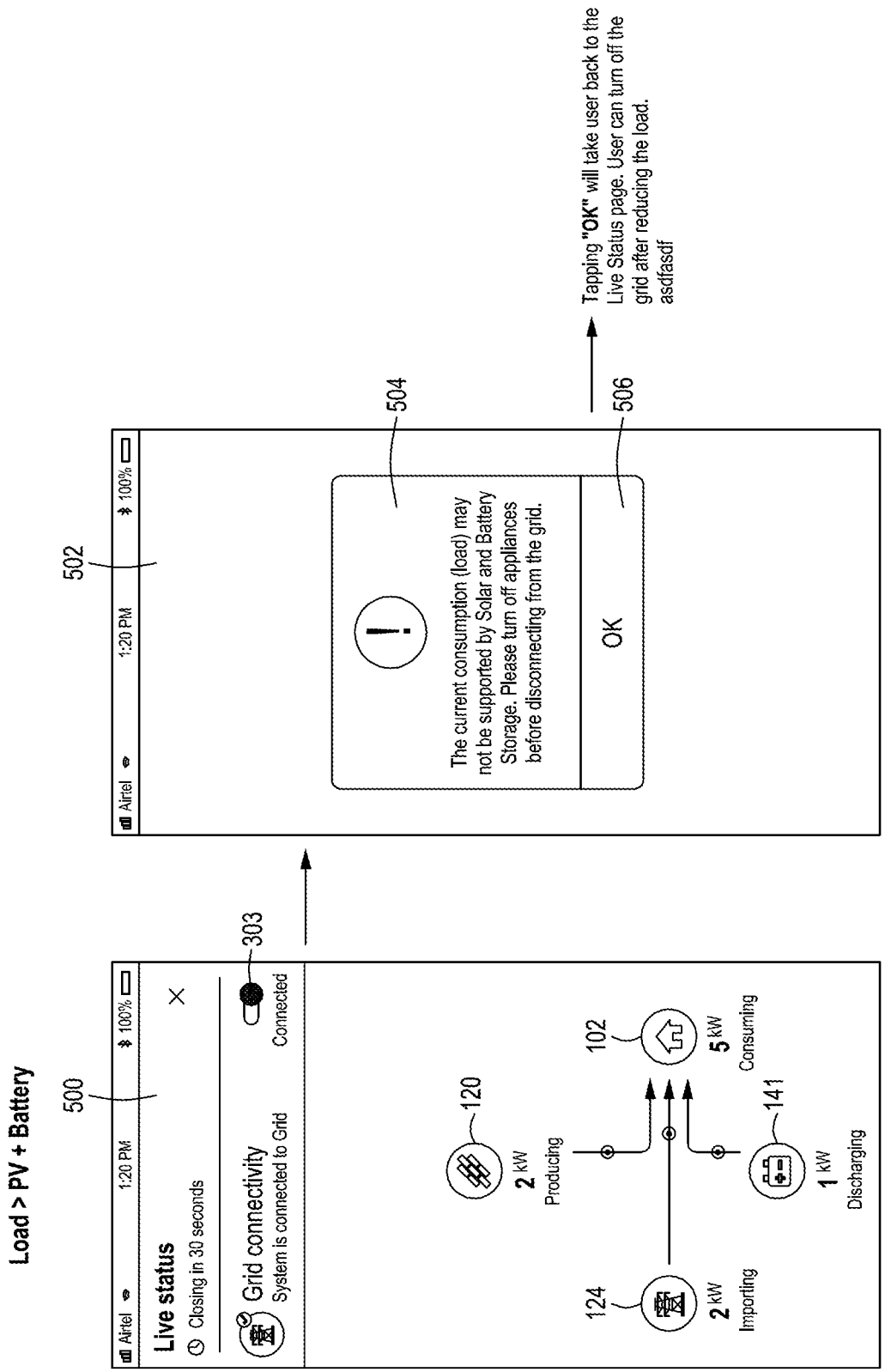
FIGS. 5A and 5B are diagrams of screens in accordance with one or more embodiments of the present disclosure.

FIGS. 5A and 5B are diagrams of screens in accordance with one or more embodiments of the present disclosure. For example, when the load is greater than the solar and the battery, e.g., load>solar+battery, the DER controller 116 is configured to transmit a live status screen 500 (FIG. 5A). For example, the live status screen 500 displays the grid 124 as currently being connected (e.g., at a toggle button 303) and a flow diagram illustrating a relationship between the grid 124, the batteries 141, the plurality of RESs 120 (e.g., PV module), and the structure 102.

In FIG. 5A the live status screen 500 shows the plurality of RESs 120 producing and providing power to the structure 102, the batteries 141 (e.g., discharging), and the grid 124 (e.g., importing). In such a scenario, the DER controller 116 is configured to transmit to the user 140 an alert screen 502 (FIG. 5B). The alert screen 502 can display a message 504 including text such as, for example, the current consumption (load) may not be supported by the solar and battery storage, and one or more appliances may need to be turned off. The message 504 may also include an input area 506, e.g., ok, for receiving a user gesture, e.g., a tap, slide, voice command, or the like. Upon gesturing, e.g., tapping, at the input area 506, the user 140 can be directed back to the live status screen 500 where the user 140 can disconnect from the grid using the toggle button 303.

FIGS. 6A and 6B are diagrams of screens in accordance with one or more embodiments of the present disclosure. For example, when the SOC is less than a reserve capacity, e.g., SOC<reserve capacity, the DER controller 116 is configured to transmit a live status screen 600 (FIG. 6A). For example, the live status screen 600 displays the grid 124 as currently being connected (e.g., at a toggle button 303) and a flow diagram illustrating a relationship between the grid 124, the batteries 141, the plurality of RESs 120 (e.g., PV module), and the structure 102.

In FIG. 6A the live status screen 600 shows the plurality of RESs 120 producing and providing power to the structure 102, the batteries 141 (e.g., discharging), and the grid 124 (e.g., exporting). In such a scenario, the DER controller 116 is configured to transmit to the user 140 an alert screen 602 (FIG. 6B). The alert screen 602 can display a message 604 including text such as, for example, the battery storage level is less than battery reserve, and try disconnecting from the grid once storage reaches reserve level. The alert screen 602 can display information areas 603 and 605 that are configured to display a current battery storage percentage and a battery reserve percentage, respectively. The message 604 may also include an input area 606, e.g., ok, for receiving a user gesture, e.g., a tap, slide, voice command, or the like.

Upon gesturing, e.g., tapping, at the input area 606, the user 140 can be directed back to the live status screen 500 where the user can disconnect from the grid using the toggle button 303.

Figures 7A, 7B, 7C:
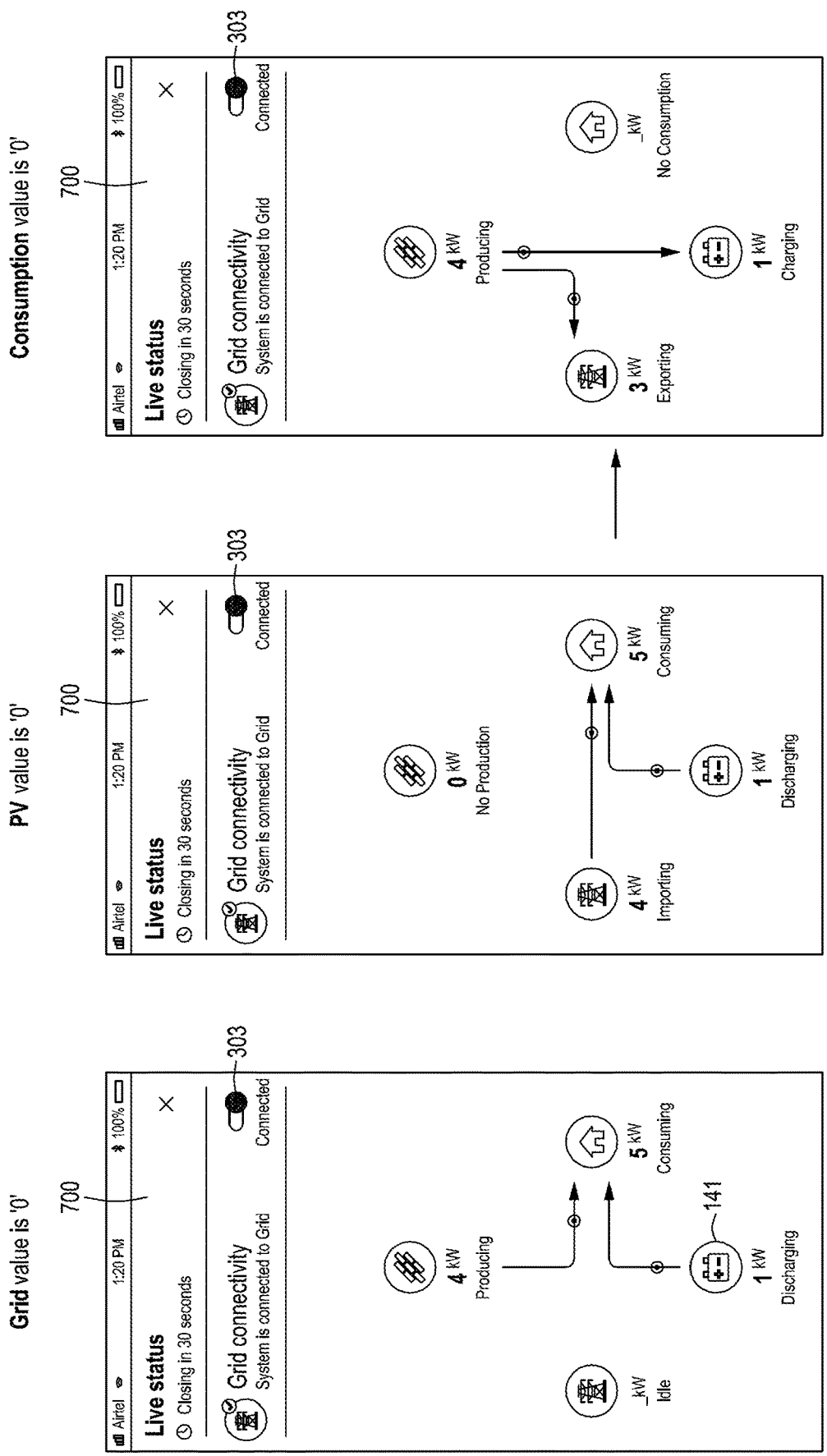
FIGS. 7A-7F are diagrams of screens in accordance with one or more embodiments of the present disclosure.

FIGS. 7A-7F are diagrams of screens in accordance with one or more embodiments of the present disclosure. For example, FIGS. 7A-7C illustrate a live status screen 700, which can be transmitted by the DER controller 116, that displays the grid 124 as currently being connected (e.g., at a toggle button 303) and a flow diagram illustrating a relationship between the grid 124, the batteries 141, the plurality of RESs 120 (e.g., PV module), and the structure 102. In FIG. 7A the live status screen 700 shows the plurality of RESs 120 producing and providing power to the structure 102, the batteries 141 (e.g., discharging), and the grid 124 connected but having a grid value of zero (e.g., neither importing or exporting). In FIG. 7B the live status screen 700 shows the plurality of RESs 120 having a value of zero (e.g., not producing), the grid 124 connected and providing power to the structure 102, and the batteries 141 (e.g., discharging). In FIG. 7C the live status screen 700 shows the plurality of RESs 120 producing and providing power to the grid 124 (e.g., exporting), the batteries 141 (e.g., charging), and the structure 102 having a consumption value of zero (e.g., no consumption).

Figure 7D:
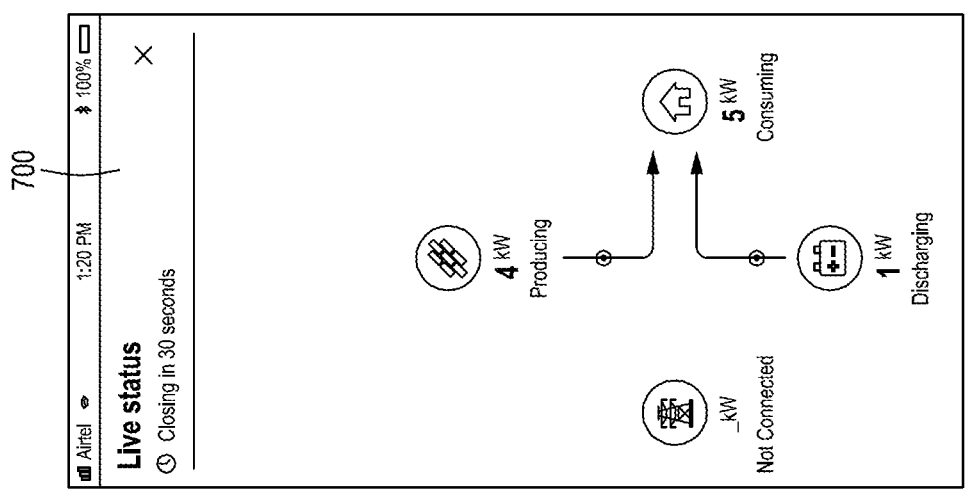
Figure 7E:
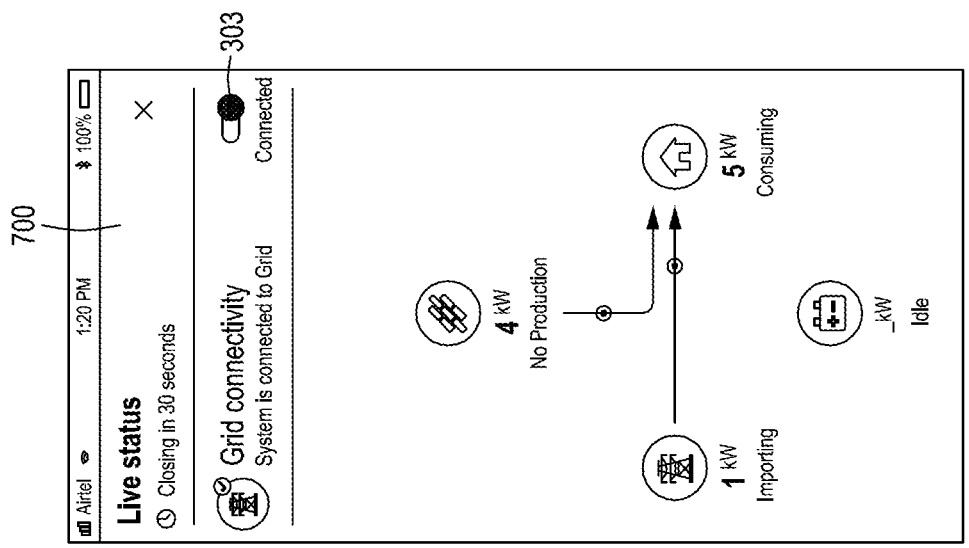
Figure 7F:
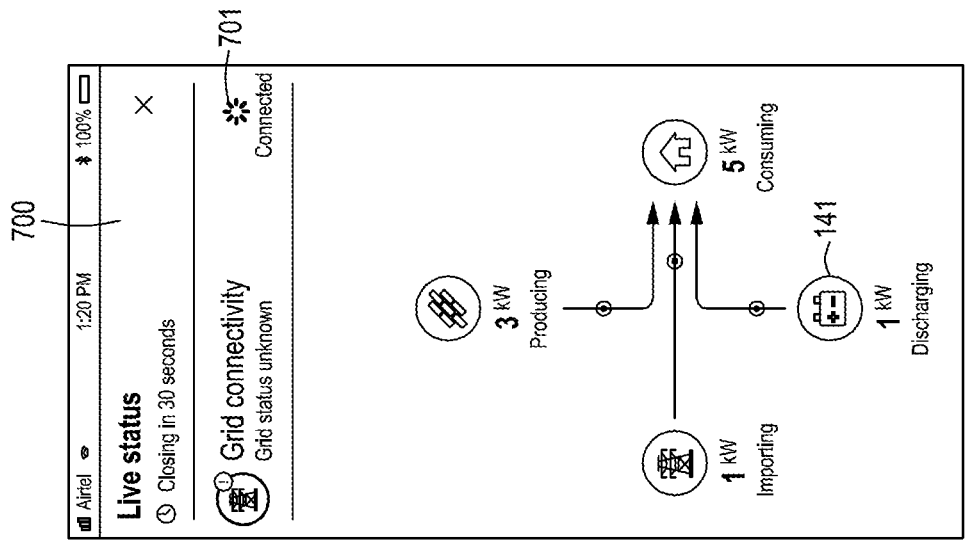

For example, FIGS. 7D-7F illustrate a live status screen 700, which can be transmitted by the DER controller 116, that displays the grid 124 as currently being in one or more states and a flow diagram illustrating a relationship between the grid 124, the batteries 141, the plurality of RESs 120 (e.g., PV module), and the structure 102. In FIG. 7D the live status screen 700 shows the grid 124 being in an unknown state (e.g., toggle button 303 replaced by a different icon 701), the plurality of RESs 120 producing and providing power to the structure 102, the batteries 141 (e.g., discharging), and the grid 124 believed to be connected (e.g., importing). In FIG. 7E the live status screen 700 shows the grid 124 connected (e.g., at the toggle button 303), the plurality of RESs 120 producing and providing power to the structure 102, the grid 124 connected (e.g., importing), and the batteries 141 idle (e.g., neither charging or discharging). In FIG. 7F, the live status screen 700 is shown without the toggle button 303, but with the plurality of RESs 120 producing and providing power to the structure 102, the grid 124 not connected, and the batteries 141 (e.g., discharging).

While the foregoing is directed to embodiments of the present disclosure, other and further embodiments of the disclosure may be devised without departing from the basic scope thereof.

The invention claimed is:

1. A method for grid connectivity control, comprising:
receiving status information of a microgrid configured to connect to a grid;
transmitting a live status update screen of the microgrid to a user, the live status update screen comprising a grid connectivity button configured to receive a user input;
transmitting to the user a disconnect grid screen comprising a first selectable area and a second selectable area, wherein the first selectable area allows a user to select when the user's structure reconnects back to the grid based on when a battery charge reaches a determined reserve capacity, and wherein the second selectable area allows the user to select when the user's structure reconnects back to the grid based on when the battery charge reaches a determined critical capacity;
receiving a user input for disconnecting or reconnecting a user's microgrid to the grid, respectively; and
based on the received user input, transmitting a control signal to a microgrid interconnect device connected between the microgrid and the grid for coordinating one of connection or disconnection microgrid connected to the grid.

2. The method of claim 1, wherein the microgrid comprises a photovoltaic module, a structure, and a battery, and wherein transmitting the live status update screen further comprises transmitting the live status update screen including a flowchart showing a relationship between the grid, the photovoltaic module, the structure, and the battery.

3. The method of claim 2, wherein the disconnect grid screen further comprises at least one of an estimated battery backup time area, at least one information area, at least one call-to-action button, and an input area.

4. The method of claim 3, wherein the estimated battery backup time area provides an estimation of battery backup time.

5. The method of claim 3, wherein the at least one information area comprises a first information area letting the user one of know not to turn on additional appliances or know that the microgrid is exporting to the grid and turning off the grid may impact user savings, a second information area letting the user know that an estimated battery backup time will change with energy consumption and solar production, and a third information area letting the user know that they can connect back to the grid at any time.

6. The method of claim 3, wherein the at least one call-to-action button comprises two call-to-action buttons, a first call-to-action button for keeping a user's structure connected to the grid and a second call-to-action button for disconnecting the user's structure from the grid.

7. The method of claim 3, wherein the input area is configured to receive a user's password.

8. The method of claim 2, further comprising transmitting another live status update screen of the microgrid to the user, the another live status update screen showing the grid connectivity button in one of a connected or disconnected configuration and the flowchart showing an updated relationship between the grid, the photovoltaic module, the structure, and the battery.

9. The method of claim 8, wherein the another live status update screen further shows an estimated battery backup time.

10. The method of claim 2, further comprising transmitting to the user an alert screen comprising an input area for receiving a user gesture and a message indicating that one of a current consumption may not be supported by the photovoltaic module and the battery or a current battery storage percentage and a battery reserve percentage.

11. A non-transitory computer readable storage medium having stored thereon instructions that when executed by a processor perform a method for grid connectivity control, comprising:
receiving status information of a microgrid configured to connect to a grid;
transmitting a live status update screen of the microgrid to a user, the live status update screen comprising a grid connectivity button configured to receive a user input;
transmitting to the user a disconnect grid screen comprising a first selectable area and a second selectable area, wherein the first selectable area allows a user to select when the user's structure reconnects back to the grid based on when a battery charge reaches a determined reserve capacity, and wherein the second selectable area allows the user to select when the user's structure reconnects back to the grid based on when the battery charge reaches a determined critical capacity;

receiving a user input for disconnecting or reconnecting a user's microgrid to the grid, respectively; and based on the received user input, transmitting a control signal to a microgrid interconnect device connected between the microgrid and the grid for coordinating one of connection or disconnection microgrid connected to the grid.

12. The non-transitory computer readable storage medium of claim 11, wherein the microgrid comprises a photovoltaic module, a structure, and a battery, and wherein transmitting the live status update screen further comprises transmitting the live status update screen including a flowchart showing a relationship between the grid, the photovoltaic module, the structure, and the battery.

13. The non-transitory computer readable storage medium of claim 12, wherein the disconnect grid screen further comprises at least one of an estimated battery backup time area, at least one information area, at least one call-to-action button, and an input area.

14. The non-transitory computer readable storage medium of claim 13, wherein the estimated battery backup time area provides an estimation of battery backup time.

15. The non-transitory computer readable storage medium of claim 13, wherein the at least one information area comprises a first information area letting the user one of know not to turn on additional appliances or know that the microgrid is exporting to the grid and turning off the grid may impact user savings, a second information area letting the user know that an estimated battery backup time will change with energy consumption and solar production, and a third information area letting the user know that they can connect back to the grid at any time.

16. The non-transitory computer readable storage medium of claim 13, wherein the at least one call-to-action button comprises two call-to-action buttons, a first call-to-action button for keeping a user's structure connected to the grid and a second call-to-action button for disconnecting the user's structure from the grid.

17. The non-transitory computer readable storage medium of claim 13, wherein the input area is configured to receive a user's password.

18. An apparatus for grid connectivity control, comprising:

a microgrid configured to connect to a grid; and a controller configured to receive status information of the microgrid, transmit a live status update screen of the microgrid to a user, the live status update screen comprising a grid connectivity button configured to receive a user input, transmit to the user a disconnect grid screen comprising a first selectable area and a second selectable area, wherein the first selectable area allows a user to select when the user's structure reconnects back to the grid based on when a battery charge reaches a determined reserve capacity, and wherein the second selectable area allows the user to select when the user's structure reconnects back to the grid based on when the battery charge reaches a determined critical capacity, receive a user input for disconnecting or reconnecting a user's microgrid to the grid, respectively, and based on a received user input, transmit a control signal to a microgrid interconnect device connected between the microgrid and the grid for coordinating one of connection or disconnection microgrid connected to the grid.

* * * * *